US010899249B2

(12) United States Patent
Parsons et al.

(10) Patent No.: US 10,899,249 B2
(45) Date of Patent: Jan. 26, 2021

(54) STRUT INSULATORS

(71) Applicant: AFL Telecommunications LLC, Duncan, SC (US)

(72) Inventors: David Eric Parsons, Duncan, SC (US); James David Logan, Greer, SC (US); Gary Richard Clarner, Moore, SC (US); Heber Sinab Vicario, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 455 days.

(21) Appl. No.: 15/902,758

(22) Filed: Feb. 22, 2018

(65) Prior Publication Data

US 2019/0106015 A1    Apr. 11, 2019

Related U.S. Application Data

(60) Provisional application No. 62/569,233, filed on Oct. 6, 2017.

(51) Int. Cl.
| | |
|---|---|
| *B60M 1/20* | (2006.01) |
| *H01B 17/50* | (2006.01) |
| *H01B 17/38* | (2006.01) |
| *H01B 3/44* | (2006.01) |
| *H01B 17/66* | (2006.01) |
| *H01B 17/16* | (2006.01) |
| *H01B 17/32* | (2006.01) |

(52) U.S. Cl.
CPC ............. *B60M 1/20* (2013.01); *H01B 3/445* (2013.01); *H01B 17/38* (2013.01); *H01B 17/50* (2013.01); *H01B 17/16* (2013.01); *H01B 17/325* (2013.01); *H01B 17/66* (2013.01)

(58) Field of Classification Search
CPC .......... B60M 1/20; B60M 1/24; H01B 3/445; H01B 17/38; H01B 17/50; H01B 17/16; H01B 17/325; H01B 17/66; F16B 7/187
See application file for complete search history.

(56) References Cited

U.S. PATENT DOCUMENTS

| | | | | |
|---|---|---|---|---|
| 4,679,672 | A * | 7/1987 | Seddon | B60M 1/20 174/45 R |
| 5,380,961 | A * | 1/1995 | Ronning | B60M 1/20 191/41 |
| 9,732,780 | B2 * | 8/2017 | Anderson | B60M 1/20 |
| 9,751,428 | B2 * | 9/2017 | Formenti | F16L 3/00 |
| 10,476,249 | B2 * | 11/2019 | Lindsey | H02G 7/05 |
| 2012/0061197 | A1 * | 3/2012 | Pasta | B60M 1/20 191/40 |
| 2012/0175479 | A1 * | 7/2012 | Graham | B60M 1/20 248/291.1 |
| 2019/0106015 | A1 * | 4/2019 | Parsons | H01B 3/445 |

* cited by examiner

*Primary Examiner* — Jason C Smith
(74) *Attorney, Agent, or Firm* — Dority & Manning, P.A.

(57) ABSTRACT

A strut insulator for an overhead rail contact system includes a first end fitting, the first end fitting defining an inner side pocket, and a second end fitting spaced from the first end fitting, the second end fitting defining an inner side pocket. The strut insulator further includes a rod extending between the first end fitting and the second end fitting and extending into the inner side pockets of the first and second end fittings, the rod defining a length. The strut insulator further includes a shell surrounding a portion of rod, the shell extending along a portion of the length of the rod, the shell formed from a fluoropolymer.

20 Claims, 3 Drawing Sheets

STRUT INSULATORS

PRIORITY STATEMENT

The present application claims priority to U.S. Provisional Patent Application Ser. No. 62/569,233, filed Oct. 6, 2017, which is incorporated by reference herein in its entirety.

FIELD

The present disclosure relates generally to overhead rail contact systems, and more particularly to improved strut insulators for overhead rail contact systems.

BACKGROUND

Overhead rail contact systems generally provide power to, for example, trains and other similar power transit vehicles. In general, a cantilever system holds various cables, etc., over such transit vehicle and allows the components to contact the transit vehicle. The cantilever system is, in turn, connected to a pole or other suitable support structure.

To isolate the system voltage and prevent injury to passengers and other people in the vicinity of the system, strut insulators are utilized to connect the cantilever system to the support structure. However, many presently known strut insulators have a variety of disadvantages. For example, many known strut insulators have characteristics which contribute to electrical leakage, such as carbon tracking due to rust or voltage tracking along the surface of the insulator due to environmental pollutants such as ultraviolet radiation as well as magnesium chloride and various other airborne matters. These issues can cause safety concerns, such as due to the strut insulators breaking down, and can reduce the life expectancy of such known strut insulators.

Accordingly, improved strut insulators are desired in the art. In particular, strut insulators having improved characteristics which reduce the risk of electrical leakage, and which have reduced potential for safety concerns and increased life expectancy, would be advantageous.

BRIEF DESCRIPTION

Aspects and advantages of the invention will be set forth in part in the following description, or may be obvious from the description, or may be learned through practice of the invention.

In accordance with one embodiment, a strut insulator for an overhead rail contact system is provided. The strut insulator includes a first end fitting, the first end fitting defining an inner side pocket, and a second end fitting spaced from the first end fitting, the second end fitting defining an inner side pocket. The strut insulator further includes a rod extending between the first end fitting and the second end fitting and extending into the inner side pockets of the first and second end fittings, the rod defining a length. The strut insulator further includes a shell surrounding a portion of rod, the shell extending along a portion of the length of the rod, the shell formed from a fluoropolymer.

In accordance with another embodiment, a strut insulator for an overhead rail contact system is provided. The strut insulator includes a first end fitting, the first end fitting formed from a metal and defining an inner side pocket, and a second end fitting spaced from the first end fitting, the second end fitting formed from a metal and defining an inner side pocket. The strut insulator further includes a fiberglass rod extending between the first end fitting and the second end fitting and extending into the inner side pockets of the first and second end fittings, the rod defining a length. The strut insulator further includes a shell surrounding a portion of rod, the shell extending along a portion of the length of the rod, the shell formed from a fluoropolymer. At least a portion of the shell is exposed between the first end fitting and the second end fitting, and the rod is unexposed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
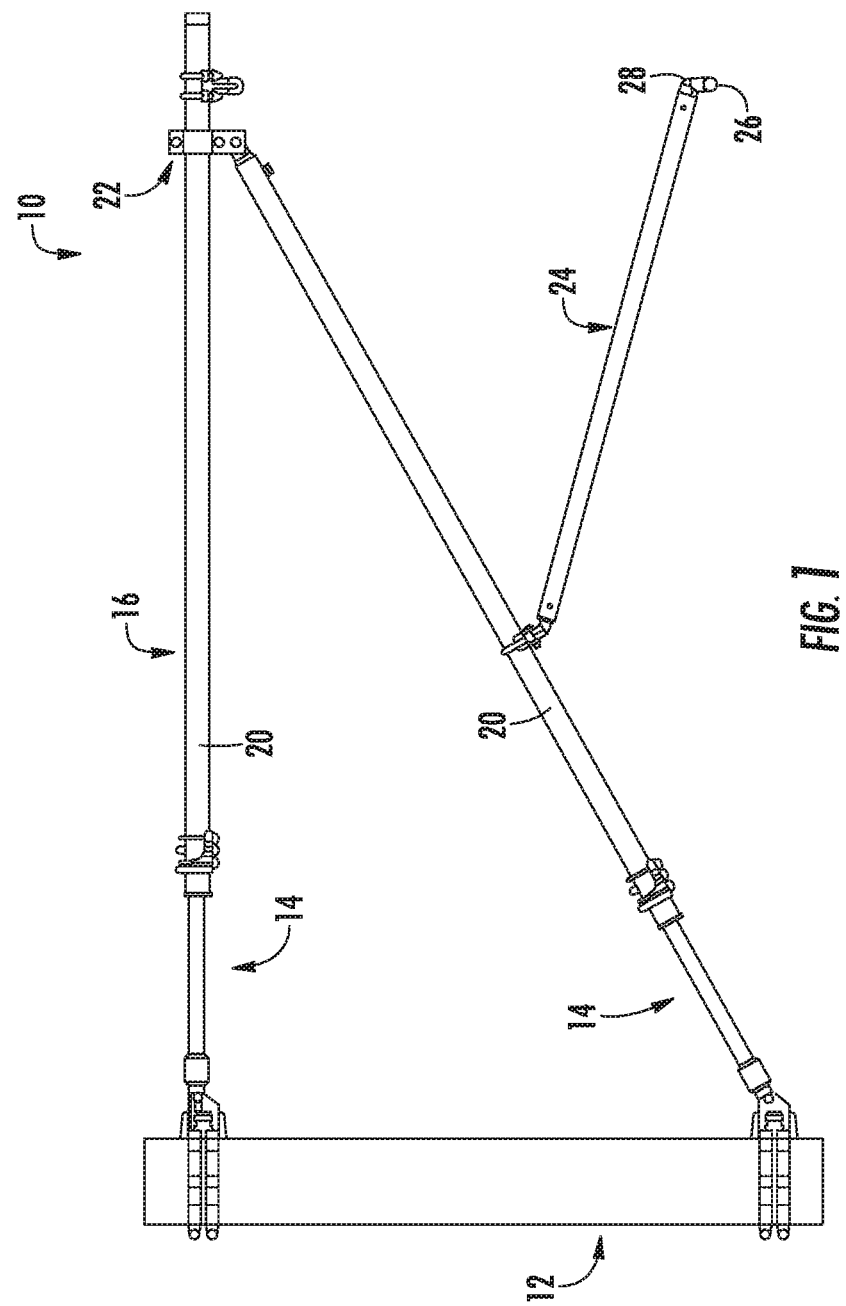
FIG. 1 illustrates one embodiment of an overhead rail contact system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, one embodiment of an overhead rail contact system 10 is illustrated. System 10 includes a pole 12 or other suitable support structure. System 10 further includes one or more strut insulators 14 which connect a cantilever system 16 to the pole 12 or other suitable support structure. For example, one end of a strut insulator 14 may be connected to the pole 12 or other suitable support structure, and the other end of the strut insulator 14 may be connected to a component of the cantilever system 16. Various embodiments of suitable end fittings for use on the ends of the strut insulator 12 for connection to the pole 12 or other suitable support structure and to the cantilever system 16 are discussed herein, although it should be understood that the present disclosure is not limited to such embodiments.

Cantilever system 16 may include one or more pipes 20, an end of each of which may be connected to an end of a strut insulator 14. A clamp 22 may also connect the pipes 20 together, such as at or near opposing ends of the pipes 20. The pipes 20 are generally cantilevered from the strut insulators 14, as shown. A steady arm 24 or other suitable extension component may be connected to one of the pipes 20, and may be generally cantilevered from such pipe 20. At the free end of the steady arm 24 or other suitable extension component, a contact wire 26 may be held by a clamp 28. The contact wire 26 may contact the train or other power transit vehicle, as is generally understood.

It should be understood that the present disclosure is not limited to the above-disclosed overhead rail contact systems 10 using cantilever systems 16. For example, strut insulators 14 in accordance with the present disclosure may be utilized in systems 10 which utilize tunnel arms, special work arrangements for overhead conductor rails, or other suitable assemblies which provide voltage insulation from the ground and from the public.

Referring now to FIGS. 2 through 8, embodiments of strut insulators 14 in accordance with the present disclosure are provided. As shown, a strut insulator 14 in accordance with the present disclosure includes a first end fitting 30 and a second end fitting 40. The first end fitting 30 defines an inner side pocket 32 which, when assembled, faces the second end fitting 40. The second end fitting 40 defines an inner side pocket 42 which, when assembled, faces the first end fitting 30. As shown, the second end fitting 40 is spaced apart from the first end fitting 30, such as along a longitudinal axis of the strut insulator 14.

The first and second end fittings 30, 40 may each further include an outer end connector. The outer end connectors may connect the first and second end fittings 30, 40, and thus the strut insulator 14 generally, to other components in the cantilever system 16 and/or contact system 10. For example, the outer end connector of the first end fitting 30 may connect the strut insulator 14 to a connector component on/of the pole 12 or other suitable support structure. The outer end connector of the second end fitting 40 may connect the strut insulator 14 to a connector component on/of another component of the cantilever system 16/or contact system 10, such as a pipe 20. The outer end connectors of the first and second end fittings 30, 40, may be the same, or may be different, depending on the application.

Figure 2:
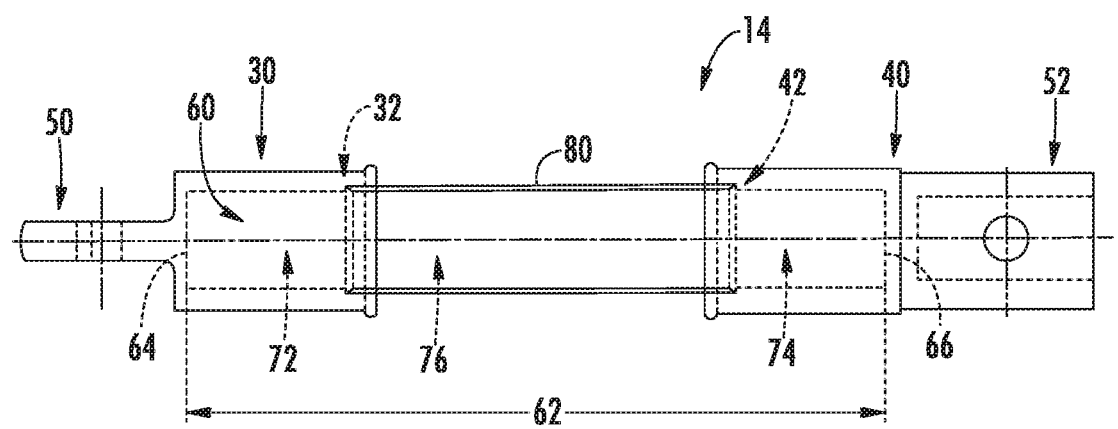
FIG. 2 is a side view of a strut insulator in accordance with embodiments of the present disclosure.
Figure 3:
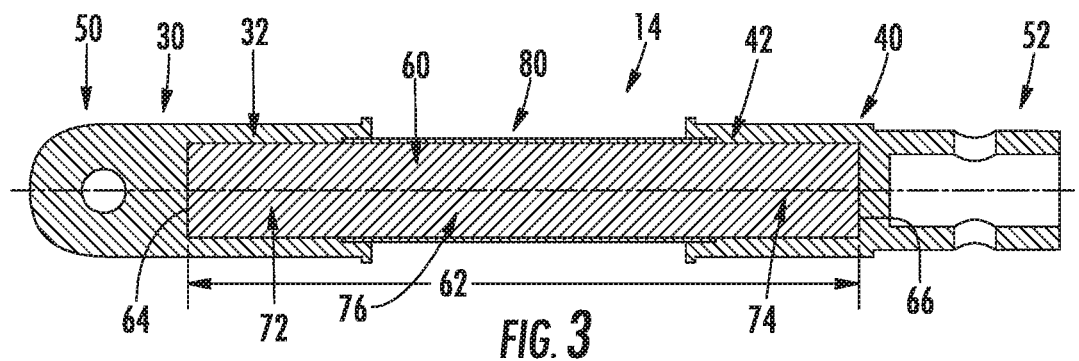
FIG. 3 is a side sectional view of the strut insulator of FIG. 2.
Figure 6:
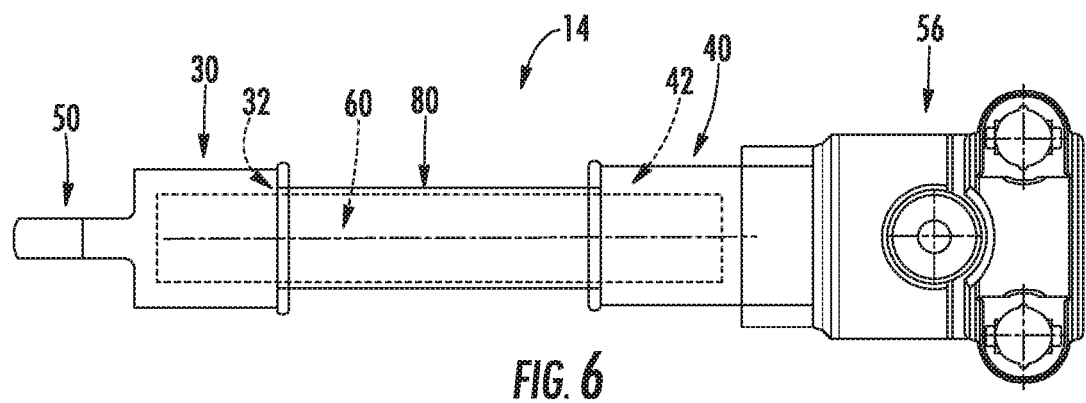
FIG. 6 is a side view of a strut insulator in accordance with other embodiments of the present disclosure.
Figure 7:
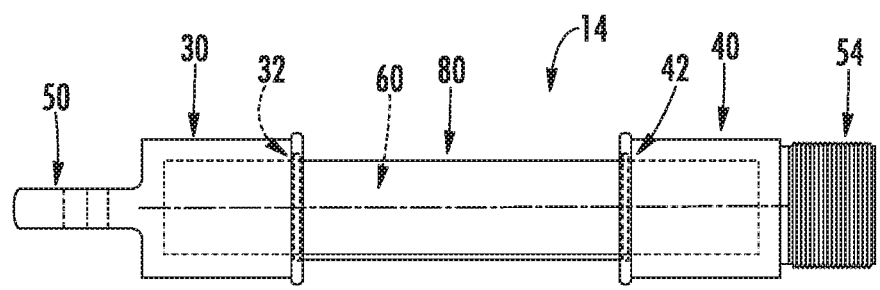
FIG. 7 is a side view of a strut insulator in accordance with other embodiments of the present disclosure.
Figure 8:
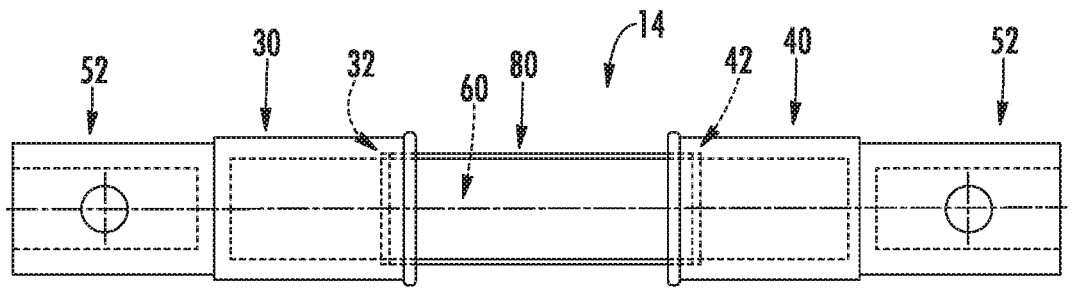
FIG. 8 is a side view of a strut insulator in accordance with other embodiments of the present disclosure.

For example, in some embodiments, an outer end connector may be a tongue 50, as illustrated in FIGS. 2, 3, 6, and 7. In these embodiments, tongue 50 is shown as the outer end connector of the first end fitting 30, but tongue 50 may additionally or alternatively be the outer end connector of the second end fitting 40. In some embodiments, an outer end connector may be a non-threaded pipe end 52, as illustrated in FIGS. 2, 3, and 8. In FIGS. 2 and 3, the non-threaded pipe end 52 is shown as the outer end connector of the second end fitting 40, but non-threaded pipe end 52 may additionally or alternatively be the outer end connector of the second end fitting 40. FIG. 8 illustrates the non-threaded pipe end 52 as the outer end connector of both the first and second end fittings 30, 40. In some embodiments, an outer end connector may be a threaded pipe end 54, as illustrated in FIG. 7. The threaded pipe end 54 is shown as the outer end connector of the second end fitting 40, but threaded pipe end 54 may additionally or alternatively be the outer end connector of the first end fitting 30.

In some embodiments, an outer end connector may be a clamp 56, as illustrated in FIG. 6. The clamp 56 is shown as the outer end connector of the second end fitting 40, but clamp 56 may additionally or alternatively be the outer end connector of the first end fitting 30. It should be understood that the present disclosure is not limited to the above-disclosed embodiments, and rather that any suitable outer end connectors are within the scope and spirit of the present disclosure.

In exemplary embodiments, the first end fitting 30 and second end fitting 40 are each formed from a metal. In particular exemplary embodiments, the metal is aluminum, although other suitable metals such as iron (such as galvanized iron), steel (such as stainless steel), or bronze may be utilized. It should be understood, however, that the present disclosure is not limited to metals, and that in alternative embodiments, other suitable materials may be utilized.

In some embodiments, the connection of the first and second end fittings 30, 40 to other components in the cantilever system 16 and/or contact system 10 may be a swaged connection. Alternatively, other suitable connecting techniques may be utilized.

Strut insulator 14 further includes a rod 60 which extends between the first end fitting 30 and the second end fitting 40, such as along the longitudinal axis. Rod 60 further extends into the first and second end fittings 30, 40, such as into the inner side pockets 32, 42 thereof. Rod 60 may define a length 62, and may further extend between a first end 64 (which may be disposed within the inner side pocket 32) and a second end 66 (which may be disposed within the inner side pocket 42).

Further, rod 60 may include a first end portion 72, a second end portion 74, and an intermediate portion 76 disposed between the first and second end portions 72, 74. Each of the first end portion 72, second end portion 74, and intermediate portion 76 may be a portion of the length 62 of the rod 60, and the portions 72, 74, 76 may together form the entire length 62 of the rod 60. First end portion 72 may include the first end 64, and second end portion 74 may include the second end 66. When assembled, the first end portion 72 may be disposed (such as entirely disposed) within the inner side pocket 32, and the second end portion 74 may be disposed (such as entirely disposed) within the inner side pocket 42.

In exemplary embodiments, rod 60 is formed from a fiber reinforced polymer material, such as fiberglass. Alternatively, other suitable materials may be utilized.

Strut insulator 14 further includes a shell 80. The shell 80 may surround a portion of the rod 60, and may extend along a portion of the length 62. Accordingly, a length-wise portion of the rod 60 may be entirely surrounded by the shell 80. Shell 80 may, for example, surround the intermediate portion 76. In exemplary embodiments as shown, shell 80 may not surround the first and second end portions 72, 74.

In exemplary embodiments, shell 80 is bonded to rod 60. Alternatively, shell 80 may not be bonded to rod 60. In general, however, shell 80 may be in contact with rod 60.

As discussed, the first and second end portions 72, 74 of the rod 60 may be disposed in the inner side pockets 32, 42. Portions of the intermediate portion 76 may be disposed in the inner side pockets 32, 42, but at least a portion or all of the intermediate portion 76 may be exterior to the inner side pockets 32, 42 and disposed between the first and second end fittings 30, 40 (such as along the longitudinal axis). Accordingly, in exemplary embodiments, at least a portion of the shell 80 may be exposed between the first end fitting 30 and the second end fitting 40 (such as along the longitudinal axis). In some embodiments, shell 80 may further extend into the inner side pocket 32 and/or the inner side pocket 42. In exemplary embodiments, because shell 80 and end fittings 30, 40 together surround rod 60 as discussed herein, the rod 60 (such as the entire rod 60) is thus unexposed.

Shell 80 is formed from a fluoropolymer. In exemplary embodiments, the fluoropolymer is polytetrafluoroethylene. Alternatively, other suitable fluoropolymers may be utilized. The present inventors have discovered that the use of such material in the shell 80, in combination with the end fittings 30, 40 and rod 60 as discussed above, advantageously provide improved characteristics which reduce the risk of electrical leakage and which have reduced potential for safety concerns and increased life expectancy. For example, the use of such material in combination with the other components as described herein advantageously isolates the power grid from pedestrians much better and longer, and additionally improves the frequency and duration of cleaning time required per location. Further, the strut insulators 14 are protected from being contaminated and contributing to electrical shorting, and abrasion during installation, shipping and storage is reduced or prevented.

Figure 4:
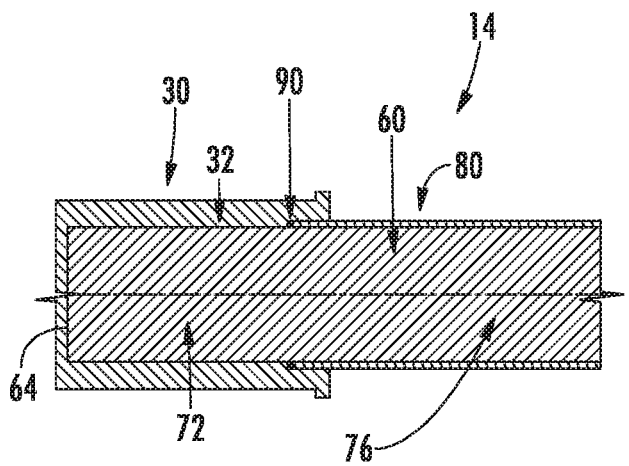
FIG. 4 is a side sectional view of portions of a strut insulator in accordance with embodiments of the present disclosure.
Figure 5:
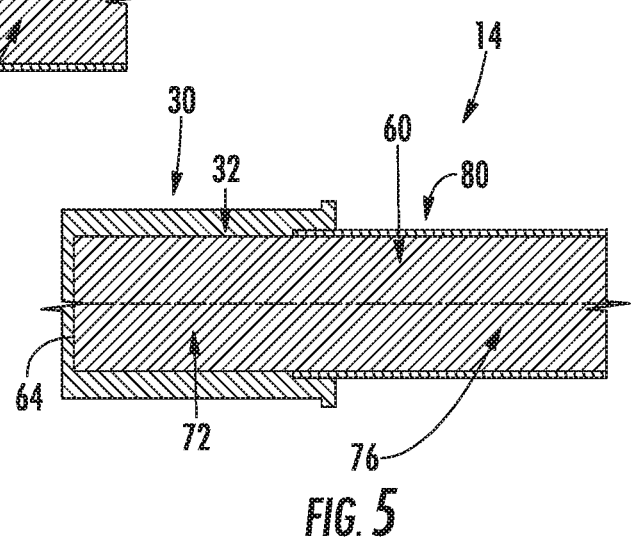
FIG. 5 is a side sectional view of portions of a strut insulator in accordance with other embodiments of the present disclosure.

As discussed, in some embodiments, shell 80 may extend into the inner side pocket 32 and/or the inner side pocket 42. In some embodiments, as illustrated in FIG. 4, an O-ring 90 may be provided in such inner side pocket 32 and/or inner side pocket 42. The O-ring 90 may contact an end of the shell 80 and be disposed between the end of the shell 80 and an inner surface of the end fitting 30, 40 defining the inner side pocket 32, 42. Alternatively, as illustrated in FIG. 5, O-ring 90 need not be provided. In these embodiments, the end of the shell 80 may directly contact the inner surface of the end fitting 30, 40 defining the inner side pocket 32, 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A strut insulator for an overhead rail contact system, the strut insulator comprising:
a first end fitting, the first end fitting defining an inner side pocket;
a second end fitting spaced from the first end fitting, the second end fitting defining an inner side pocket;
a rod extending between the first end fitting and the second end fitting and extending into the inner side pockets of the first and second end fittings, the rod defining a length, wherein the rod extends between a first end and a second end and comprises a first end portion, an intermediate portion, and a second end portion, the first end portion comprising the first end, the second end portion comprising the second end, the intermediate portion disposed between the first end portion and the second end portion; and
a shell surrounding the intermediate portion of the rod, the shell extending along a portion of the length of the rod, the shell formed from a fluoropolymer.

2. The strut insulator of claim 1, wherein the fluoropolymer is polytetrafluoroethylene.

3. The strut insulator of claim 1, wherein the rod is a fiberglass rod.

4. The strut insulator of claim 1, wherein the first end fitting and the second end fitting are each formed from a metal.

5. The strut insulator of claim 4, wherein the metal is aluminum.

6. The strut insulator of claim 1, wherein the first end portion is disposed within the inner side pocket of the first end fitting and the second end portion is disposed within the inner side pocket of the second end fitting.

7. The strut insulator of claim 1, wherein at least a portion of the shell is exposed between the first end fitting and the second end fitting.

8. The strut insulator of claim 1, wherein the shell extends into the inner side pocket of the first end fitting and the inner side pocket of the second end fitting.

9. The strut insulator of claim 1, further comprising an O-ring disposed within each inner side pocket of the first and second end fittings, the O-rings in contact with the shell.

10. The strut insulator of claim 1, wherein the rod is unexposed.

11. A strut insulator for an overhead rail contact system, the strut insulator comprising:
a first end fitting, the first end fitting formed from a metal and defining an inner side pocket;
a second end fitting spaced from the first end fitting, the second end fitting formed from a metal and defining an inner side pocket;
a fiberglass rod extending between the first end fitting and the second end fitting and extending into the inner side pockets of the first and second end fittings, the rod defining a length, wherein the rod extends between a first end and a second end and comprises a first end portion, an intermediate portion, and a second end portion, the first end portion comprising the first end, the second end portion comprising the second end, the intermediate portion disposed between the first end portion and the second end portion; and
a shell surrounding the intermediate portion of the rod, the shell extending along a portion of the length of the rod, the shell formed from a fluoropolymer,
wherein at least a portion of the shell is exposed between the first end fitting and the second end fitting, and
wherein the rod is unexposed.

12. The strut insulator of claim 11, wherein the fluoropolymer is polytetrafluoroethylene.

13. The strut insulator of claim 11, wherein the metal of the first and second end fittings is aluminum.

14. The strut insulator of claim 11, wherein the first end portion is disposed within the inner side pocket of the first end fitting and the second end portion is disposed within the inner side pocket of the second end fitting.

15. The strut insulator of claim 11, wherein the shell extends into the inner side pocket of the first end fitting and the inner side pocket of the second end fitting.

16. The strut insulator of claim 11, further comprising an O-ring disposed within each inner side pocket of the first and second end fittings, the O-rings in contact with the shell.

17. A strut insulator for an overhead rail contact system, the strut insulator comprising:
a first end fitting, the first end fitting defining an inner side pocket;
a second end fitting spaced from the first end fitting, the second end fitting defining an inner side pocket;

a rod extending between the first end fitting and the second end fitting and extending into the inner side pockets of the first and second end fittings, the rod defining a length;

a shell surrounding a portion of the rod, the shell extending along a portion of the length of the rod, the shell formed from a fluoropolymer; and an O-ring disposed within each inner side pocket of the first and second end fittings, the O-rings in contact with the shell.

18. The strut insulator of claim 17, wherein the rod is a fiberglass rod.

19. The strut insulator of claim 17, wherein at least a portion of the shell is exposed between the first end fitting and the second end fitting.

20. The strut insulator of claim 17, wherein the rod is unexposed.

\* \* \* \* \*